United States Patent Office 3,819,596
Patented June 25, 1974

3,819,596
HOMOPOLYMERS OF ISOPROPENYL ALKYL ETHERS
James R. Gross, Lake Jackson, Tex., assignor to The Dow Chemical Company, Midland, Mich.
No Drawing. Filed Feb. 23, 1973, Ser. No. 335,378
Int. Cl. C08f 3/38
U.S. Cl. 260—91.1 M                6 Claims

ABSTRACT OF THE DISCLOSURE

Homopolymers of isopropenyl alkyl ethers having two terminal double bonds and a broad molecular weight distribution are prepared by contacting the monomer with an alkaline earth substituted sodium alumino-silicate at a temperature below 0° C.

The homopolymers are useful as hot melt adhesives for porous and non-porous substrates as well as intermediates and as internal plasticizers for vinyl polymers.

BACKGROUND OF THE INVENTION

This invention relates to rubbery homopolymers of isopropenyl alkyl ethers having two terminal double bonds and a broad molecular weight distribution and to a method of making these polymers.

It is known from Pat. 2,104,002 and Shostakovskii, et al., Chem. Abstracts 48:9899h, 51:1895h and 52:20009c that various vinyl ethers, including isopropenyl ethers, can be polymerized with Lewis acid catalysts.

Goodman, et al., J. Am. Chem. Soc. 86, 4922 (1964), and Macromolecules, I, (2), 163 (1968), have shown that poly(2-methoxypropene) prepared in this fashion is a crystalline, sharply melting polymer of syndiotactic structure.

It is also known from Pat. 3,228,923 that vinyl alkyl ethers can be polymerized over zeolitic sieves. These polymers are conventional in that little or no unsaturation is found in the polymers.

It is also known from 3,634,383 that polyisobutylene can be prepared having two terminal double bonds by contacting isobutylene with 5 A. molecular sieves.

SUMMARY OF THE INVENTION

It now has been discovered that rubbery (although syndiotactic) homopolymers of isopropenyl alkyl ethers or poly(isopropenyl alkyl ethers) wherein the alkyl groups have 1–3 carbon atoms and which includes at least two terminal double bonds can be prepared by contacting an isopropenyl alkyl ether having alkyl groups of 1–3 carbon atoms with an alkaline earth substituted sodium alumino-silicate at a temperature below about 0° C. and recovering the poly(isopropenyl alkyl ether). These polymers are useful as hot melt adhesives for both porous and non-porous substrates. They flow or melt at 50° and set to a soft plastic which is unchanged in molecular weight. The polymers are also useful as intermediates in the preparation of new and varied functional polymers by addition of various compounds across the terminal double bonds of the polymers. Some such compounds are amines, alcohols and thiols which have another functional group of interest for the preparation of new resins and foams. Another use of these terminal unsaturated polymers is as internal plasticizers in vinyl polymerization.

DETAILED DESCRIPTION

The poly(isopropenyl alkl ethers) of this invention are prepared by contacting the monomeric isopropenyl alkyl ethers at normal atmospheric pressure with an alkaline earth substituted sodium alumina-silicate at a temperature of below about 0° C. and recovering the polymers from the sieve by washing with an inert solvent for the polymer.

The temperature range is generally from −100° to 0° C. and preferably from −70° to −10° C.

The reaction is conducted either batch-wise or semi-continuously with the reaction container cooled or immersed in a Dry Ice bath to obtain the desired temperature range.

The monomeric isopropenyl alkyl ethers such as isopropenyl methyl ether, isopropenyl ethyl ether, isopropenyl propyl ether are allowed to contact the substituted sodium alumino-silicate and the polymers are formed thereon. The polymers are then washed off with an inert organic solvent for the polymers and later recovered. Alternatively, the monomers can be contacted with the alumino-silicate concurrently with an inert organic solvent, i.e. the monomers can be dissolved in the solvent before contact with the alumino-silicate.

Surprisingly, attempts to copolymerize the isopropenyl alkyl ethers with other alpha olefinic monomers such as isobutylene, styrene, and the like resulted in a mixture of two polymers—one from each monomer—and not a copolymer.

Suitable organic solvents for use in this invention are hydrocarbons such as pentane, hexane, heptane, octane, toluene, and the like. Chlorinated solvents such as methylene chloride, chloroform, carbon tetrachloride, and the like are also useful in this regard.

The polymers produced by this invention are believed to have the following unsaturated structure, which is based on intensive infra-red studies. In addition, the polymer is stereoregular (syndiotactic), which has been confirmed by nuclear magnetic resonance spectroscopy.

$$CH_2=C-CH_2-\left[-CH_2-\underset{OR}{\overset{CH_3}{C}}-\right]_n-CH=\underset{OR}{\overset{CH_3}{C}}$$
$$\phantom{CH_2=}\underset{OR}{}$$

wherein R is methyl, ethyl, or propyl, $n$ is 1 to 4000.

The polymers produced herein have a broad molecular weight distribution, from about 180 to about 800,000, measured by gel permeation chromatography, with peaks occurring between 300 and 50,000 (polystyrene standards) and an index of dispersity greater than about 20.

For the purposes of this invention, index of dispersity is defined as the ratio of the highest molecular weight species to the peak molecular weight. For illustration, in Example 1 herein, the highest molecular weight detected by G.P.C. was 300,000 and the peak molecular weight was 4200. Thus, the index of dispersity is 71.5. A high or large index of dispersity is considered to be one greater than about 20 and is a relative measure of the broadness of the molecular weight distribution.

The alkaline earth substituted sodium alumino-silicates used in this invention are commercially available and are known as synthetic zeolites. Examples of the alkaline earth metals that can be substituted for part of the sodium atoms are magnesium, calcium, strontium and barium. Calcium is the preferred alkaline earth metal. Zeolites, or molecular sieves are well known commercially and in the literature as is illustrated by Pats. 2,904,507; 3,013,988; 3,208,984; 3,228,923; 3,634,383 and the book "Molecular Sieves" by C. K. Hersh, Reinhold (1961).

The following examples are presented to illustrate but not limit the invention.

EXAMPLE 1

A ⅜" by 12" tubular reactor was packed with 24.6 g. of crushed commercially available calcium-sodium alumino-silicate zeolite which had been dried at 400° C. under a nitrogen purge.

The temperature of the bed was brought to −30° C. by circulating refrigerant through the reactor jacket. A partial vacuum (180 mm. mercury) was applied to the receiver at the bottom of the column and 50 gms. of 2-methoxy propene was fed into the top of the column over a period of 90 minutes. Adsorbed polymer was washed from the column with 50 ml. of hexane and the excess monomer and hexane were evaporated to yield 8.2 g. (16.4% viscous rubber of 4200 peak molecular weight with the gel permeation chromatogram extending clear out to 300,000 (polystyrene calibration). The index of dispersity was 71.5.

EXAMPLE 2

The temperature of the apparatus of Example 1 was lowered to −59° C. and 26 g. of 2-methoxy propene was fed through the reactor. The column was washed with 30 ml. hexane to yield 4.7 g. (18%) of a viscous rubber of 4500 peak molecular weight and the molecular weight distribution extending beyond 300,000. The index dispersity was 66.7.

EXAMPLE 3

The ⅜″ by 12″ tube reactor was packed with 23 g. of a 4:1 mixture of crushed synthetic zeolite and pelletized synthetic zeolite used in Example 1. The temperature was brought to −50° C. and the reaction carried out as before, yielding 5.3 g. (10.5%) of a viscous rubber of 6600 peak molecular weight by GPC and the distribution extending beyond 300,000. The index dispersity was 45.5.

EXAMPLE 4

A 1000 ml. three-necked flask was equipped with an air driven stirrer and a nitrogen inlet. After charging 75 g. of powdered pellets of the synthetic zeolite used in Example 1, a flameless heat gun was applied to the stirred flask under a vigorous nitrogen purge. After cooling to room temperature under a nitrogen pad, the flask was lowered into a dry ice bath and charged with 75 g. of 2-methoxy propene dissolved in 200 g. hexane. The mixture was stirred at −70° C. for 26 hours then filtered to remove the powdered zeolite. The zeolite powder was washed with methylene chloride and this filtrate was added to the hexane solution of polymer. The solvents and excess monomer were evaporated giving 28 g. (32%) of an extremely viscous rubber of 7500 peak molecular weight and a distribution extending to $2.1 \times 10^6$. The index of dispersity was 280.

When the product of Example 3, above, was analyzed by infrared spectroscopy, absorbency bands for carbon-carbon unsaturation were found at approximately 1660 cm.$^{-1}$ and 1620 cm.$^{-1}$. Relative to the intensities of carbon-carbon unsaturation bonds in decene, each of the above bands corresponded to nearly 2% of the sample by weight. Quantitative end group analysis by couliometric titration was impossible due to polymer degradation during titration.

To further illustrate this invention and demonstrate the efficacy of the alkaline earth substituted sodium alumino-silicates compared to other similar materials, the following controls were carried out.

Control A

Poly(2-methoxy propene) at 12,000 peak molecular weight with nothing greater than 69,000, was prepared at −78° C. using an iodine-ether initiator according to Goodman and Fan, J. Am. Chem. Soc., 86; 4922 (1924). This polymer was a white powder, M.P. 82–85° C. and the infrared spectrum showed no unsaturation. The index of dispersity was 5.75.

Control B

Poly(hexadecyl vinyl ether) of 9400 peak molecular weight and nothing greater than 66,000 was prepared in 73% yield at 50° C. on 5 A. molecular sieve, according to U.S. Pat. 3,228,923. The only detectable unsaturation visible in the infrared spectrograph was identified as residual monomer which was also visible in gel permeation chromatogram along with some dimer and trimer. The index of dispersity was 7.03.

Control C

Poly(2-methoxy propene) of 7700 peak molecular weight extending to 300,000 was prepared in 53% yield at 78° C. using Florida Earth (a magnesium silicate) as an initiator. This polymer displayed a single unsaturation band at 1620 cm.$^{-1}$ in the infrared corresponding to 1.0% of the sample. The index of dispersity was 38.9.

Control D

Poly(2-methoxy propane) of 32,000 peak molecular weight with the gel permeation chromatogram extending past 300,000 was prepared in 8% yield at −78° C. over a commercial 4 A. molecular sieve. This is a sodium alumino-silicate. This polymer displayed a single unsaturation band in the infrared at 1650 cm.$^{-1}$ corresponding to 1.5% of the sample. In addition, this polymer showed a significant amount of dimer and trimer in the gel permeation chromatograms which probably accounts for most of the unsaturation detected. The index of dispersity was 9.38.

As is illustrated above, initiators other than the alkaline earth substituted sodium alumino-silicates give polymers with much less or no unsaturation and other synthetic zeolites give both a reduced polymer yield and much less unsaturation.

I claim:
1. A poly(isopropenyl alkyl ether) wherein the alkyl groups have 1–3 carbon atoms and the polymer has an index of dispersity greater than about 20 and wherein the end groups are 2-alkoxy-2-propenyl and 2-alkoxy-1-propenyl radicals.
2. Poly(isopropenyl methyl ether) having an index of dispersity greater than about 20 wherein the end groups are 2-methoxy-2-propenyl and 2-methoxy - 1 - propenyl radicals.
3. A method for the preparation of a poly(isopropenyl alkyl ether) wherein the alkyl groups have 1–3 carbon atoms and the polymer has an index of dispersity greater than about 20 and wherein the end groups are 2-alkoxy-2-propenyl and 2-alkoxy-1-propenyl radicals which comprises contacting isopropenyl alkyl ether with an alkaline earth substituted sodium alumino-silicate at a temperature below about 0° C. and recovering said poly(isopropenyl alkyl ether).
4. The process as set forth in claim 3 wherein the temperature range is from −100 to 0° C.
5. The process as set forth in claim 3 wherein the temperature range is from −70° to −10° C.
6. The process as set forth in claim 3 wherein the alkyl group is a methyl group.

References Cited
UNITED STATES PATENTS

| | | | |
|---|---|---|---|
| 2,104,002 | 12/1937 | Reppe et al. | 260—91.1 A |
| 2,626,252 | 1/1953 | Tawney | 260—91.1 M |
| 3,228,923 | 1/1966 | Scott et al. | 260—91.1 M |

HARRY WONG, JR., Primary Examiner

U.S. Cl. X.R.

117—161; 260—79.5 NV, 91.1 A, 91.1 S, 874